Patented Oct. 13, 1936

UNITED STATES PATENT OFFICE 2,057,331

2,057,331

PROCESS OF PRODUCING PULPS CONTAINING RUBBER SUBSTANCES

Harry C. Fisher, Cincinnati, and George Acus, Arlington Heights, Ohio, assignors to The Richardson Company, Lockland, Ohio, a corporation of Ohio No Drawing. Application June 18, 1932, Serial No. 618,016

2 Claims. (Cl. 92—21)

In Patent No. 1,771,150 to Stevenson and Buron, there is described a process of producing a pulp containing asphalt or other thermoplastic binder. Broadly, the underlying principle involves the use of a mixing device, such as a Werner-Pfleiderer mixer, to associate the fibrous material with a non-solid binder material, whereupon the addition of water breaks down the mixture into a semi-pulp which can be refined further if desired, in a paper mill beater or similar machine and then can be used on conventional paper making devices or the like.

These process steps are valuable in any instance where it is desired to make intimate association between a non-solid substance and a fibrous material.

However, difficulty is met, when working with rubber bearing dispersions such as rubber latex, in that the rubber has a tendency to come out of the dispersed state and agglomerate into balls or lumps without assuming the desired relationship with the fibers. Although the rubber bearing material may originally be a thickened and even a plastic mass, this dispersed binder does not act as the non-solid binder of the Stevenson and Buron patent.

Our present invention deals with discoveries made by us whereby we form a preliminary association of rubber bearing dispersions without coagulating out the rubber, and whereby we then set the rubber, with the result of maintaining the association thereof with the fibers, and whereby we then proceed to form a pulp containing or composed entirely of the rubber and fiber, if desired, which we form without separating out or agglomerating of the rubber. The pulp may then be used in paper mill machinery like other pulps without special technique except that we have discovered certain treatments which give unexpected results and which we will specify in the following matter.

We propose to describe in this specification one or more practical examples of our new process, and in the claims we will cover the novelty inherent therein. Reference is hereby made to the claims to apprise the reader of the general classes of substances and essential treatments, without an attempt on our part to include such statements otherwise in this specification.

It is our primary discovery that if rubber latex dispersions or other rubber containing dispersions, are mixed with moist or wet fibrous material in the presence of sufficient of the dispersion sustaining preservative to prevent coagulation at ordinary temperature, that the preservative can be driven off by elevating the temperature and further mixing, with the result of forming a relatively stable association of fibers and rubber, that can be formed into a paper mill pulp.

A large variety of novel materials can be made using this pulp, which have surprising and very valuable characteristics.

In the following description we will first describe our process by means of examples. We will point out some of the various materials that can be employed, and will discuss the properties of a particular set of examples, and finally we will discuss in general the various possibilities of our discoveries. There is no intent in this subject matter to set a limit or bounds to our invention.

Referring first to our process using ordinary commercial rubber latex, say, of 38% solids content, this material contains around 1% or thereabouts of ammonia which acts as a preservative and prevents the rubber from precipitating out. In the process to be described this property of ammonia is employed to permit an association of the rubber with a fibrous matter to be achieved whereby the rubber does not precipitate out in masses free or substantially free of the fibers. In a preferred process the 38% latex is mixed with an equal volume of commercial concentrated ammonia solution and added to the pre-wet vegetable or mineral fibrous matter in a cold or semi-warm W. P. mixer whereby mixing is carried out to thoroughly associate the other materials with the fibrous matter. A good practice in wetting the fibers to start with, will be to soak the laps or sheets in water and then pass them through a set of squeeze rolls under slight pressure. When the inter-mixture of liquid and fibers is complete, as evidenced by visual examination of samples taken from the mixer, that is, the fibers are thoroughly and uniformly saturated with the liquors, heat is applied to drive out the ammonia simultaneously with some of the water until the rubber is set on the fibers. A test for this condition is to take some of the hot pulpy material and squeeze it between the fingers; before the rubber is set a milky latex can be expressed; if the rubber is set a clear or substantially clear watery liquid will be pressed out. This watery liquid may be brownish or dark colored due to impurities in the fibers or dirt in the mixer; but is characteristically different from the milky latex. Having reached this stage in the process, mixing can continue with the addition of more water to further break up the half-pulp or, if desired, the mixing can be continued to eliminate more water before a further breaking up is caused by the addition of more water or, in certain cases, the semi-dry mass can be charged directly into the beater.

The beater operation is not especially critical but care must be taken that the beating time be just long enough to achieve the required results, because excessive beating tends to separate the rubber from the fibers. The temperature of the beater water should be kept close to or at room temperature, say, 70 to 80 degrees F. or lower if possible, since higher temperatures accelerate the bringing away of the rubber from the fiber. The adverse conditions noted hold true especially when the rubber content is high, say, 25% or over, but are appreciable even at lower percentages.

The mechanism for carrying out this mixing process must permit the associating of the fibers with the latex at comparatively low temperatures so that the rubber is not precipitated prematurely, and then means must be employed to remove enough preservative to set the rubber on to the fibers. This requires that if one W. P. or similar mixer is used and the elimination of the preservative is done by heat, it must be provided with means for rapid heating or cooling to take care of the two stages of the process. On the other hand, if the preliminary association of ingredients is made in one mixer which always is kept cool, a more practical process is obtained. When a Banbury mixer, or similar device is available, and where the amount of rubber latex to be incorporated is low enough to be absorbed substantially completely into the fibrous matter so that there are no free liquids to run out of the mass, then the use of such a mixer is advantageous since bulky well-felted fibrous material, such as chemical paper pulp, can be broken down largely into individual fibers and can be thoroughly impregnated with the solutions of latex in the first stage of the operation in the Banbury, whereupon they then can be transferred to a secondary mixer of the W. P. type, which always is kept hot where the ammonia preservative can be eliminated, the rubber set on the fibers and the pulp broken down ready for the beater treatment.

The above descriptions have been based upon the use of a normal latex of commerce containing about 38% rubber solids. Latices of other concentrations and of substances other than rubber, such as balata or gutta percha can be used to gain certain special results or achieve economy in operation, as desired. Speaking particularly of rubber, there is, for example, the material controlled by Jeavons, Tinto & Co., Ltd., London, England, known as "Jatex", which contains about 60% rubber solids by weight, and is a thick, creamy, white liquid. Speaking of concentrated latices, generally, it is stated that in some processes of concentrating the normal latex from rubber trees to high rubber contents, many of the water soluble and undesirable resinous substances naturally associated with rubber have been eliminated, and hence a better product can be made from the concentrated latex.

Another brand of concentrated latex is sold in the United States under the name of "Revertex" and contains up to 75% rubber content. This material is a very thick, white, creamy paste and is shipped in iron drums or round paper containers. Another series of latices is sold in the United States under the name of "Lotols"; these can be purchased in various concentrations—for example, 32% and 60%. Still another type of latex goes under the name of "Vultex" and the rubber in it exists in a pre-vulcanized form. When the rubber from this latex is set by any of the methods with which it is used, the rubber already is vulcanized.

Rubber bearing pulp prepared by the above method is to be used by any of the well known paper making processes—for example, cylinder paper making machines, Fourdrinier machines, wet lap machines, pulp forming mold process, etc. The ordinary Jordaning, diluting, beating, concentrating processes are to be employed. To gain certain special results premixed pulp of other materials can be incorporated with a latex pulp in the mixers, the beaters, the chests, the vats, etc. For example, a pulp was prepared according to the teachings of Stevenson and Buron in United States Patent No. 1,771,150, of an asphalt, having a penetration at 77 degrees F. of 1 and a ball and ring melt point of 195 degrees F., with 50% unbleached sulphite. 300 parts by weight were used of each material. In a separate operation, a pulp was prepared of 100 parts of sulphite, 278 parts concentrated ammonia solution, and 278 parts of latex solution containing 38% solids. These two pulps were mixed together and refined in a beater at substantially room temperature, formed into sheets and dried in an oven. The result was a sheet of paper deep black in color, more or less glossy on the outside and a lighter brownish-black color uniform throughout on the inside. This sheet of paper combined the stiffness of a hard asphalt with the flexibility of the rubber ingredients, which properties were added to the natural body imparted by the sulphite.

Similarly, a composite pulp made from two mixes, the one containing sulphite and the rubber from latex, and the other sulphite and a polymerized rubber resin, known as "Davex", formed into sheets and dried in an oven, gave products with dark brownish exteriors and lighter brown interiors, which sheets were stiff and yet possessed considerable resiliency and had a peculiar waxy and rubbery feel.

In a similar manner pulps of natural and artificial resinous materials, waxes, gums, and the like, can be intermixed with the rubber pulp then used to give special results. If desired, in complex mixtures, certain of the ingredients can be intermixed directly with the latex if such proves feasible under the circumstances. Synthetic resinous materials, such as bakelite, phenol-aldehydes resins, the ureaformaldehyde condensation products, cumarone-formaldehyde resins, and all the various artificial resinous materials of similar nature, can be formed into pulp and used along with the rubber latex pulp described to give certain desirable results. Emulsified binders can be added directly to these pulps or can be incorporated with the fibers before their addition.

Mineral filler materials, such as clays, diatomaceous earth, or coloring matter such as iron oxide, chromic oxide, etc., or starchy matters or various other ingredients used in paper making, may be employed along with the latex pulp or the latex pulps modified by other ingredients, said substances being added to the pulp in the beater or similar place, or they can be incorporated along with the other ingredients in the mixer as conditions permit. Paper dyes for modifying the color of the sheets can be employed in the well known manner. Vulcanizing agents for the rubber can be incorporated at that point in the process which gives the best results, which ordinarily will be in the mixer where the rubber is laid down on the fibers. Thus, ammonium polysulphide has been added to the mixer and vulcanization at 100 lbs. steam pressure in a fifty ton press, has been successful.

A description now will be given of typical rubber sheets prepared by the above methods with latex of 38% consistency alone. Such a sheet contained 50% dry rubber and 50% sulphite and calipered .026", was translucent to strong daylight, had a brownish rubbery color, had a good "rattle", a Mullen test of 65 pounds per square inch, and an Elmendorf tear test of 176 units. A sheet from the same mix with a caliper of 42 points showed a Mullen test of 140 pounds per square inch and an Elmendorf tear test of 576 units. Sheets made in the same way containing 10% dry rubber from latex and 90% unbleached sulphite showed, for a caliper of 17 points, a Mullen test of 114 pounds per square inch and an Elmendorf tear test of 176 units. Finally, a sheet containing 2% dry rubber and 98% sulphite showed, for a caliper of 12 points, a Mullen test of 176 pounds per square inch and an Elmendorf tear test of 272 units. Another 2% sheet of 45 points caliper showed a Mullen test of 520 pounds per square inch. The tear test could not be determined since the sheet was too strong. An outstanding characteristic of the 2% product was its great stiffness. As the percentage of rubber in the sheet decreases, say, from 50 down to 2, the sheet becomes less and less translucent. Upon passing the 2% sheet through the bottom nip of a set of heavy board machine calenders, seven rolls high, the sheets took on an extremely high gloss but darkened in color.

We have discovered that if moist sheets containing fiber and rubber are subjected to pressure for a brief period, that the qualities of the final dried product are improved both in stiffness and otherwise. This discovery has application not only to our particular pulp, but to latex sheets formed by chemical precipitation of rubber on the fibers. For example, we have found that it is sufficient to submit the moist sheets to a ten to fifteen second pressing at about 30 pounds pressure to the square inch.

We do not limit our invention to the use of ammonia as an anti-precipitant. There is no quality of ammonia other than the one described which is of use, except that it is volatile. We might use some other preservative during the preliminary association and then inhibit its action by changing it chemically. We might do this with the ammonia for that matter. There is value, however, we believe, in using a volatile anti-precipitant because it is easy to gradually evaporate it from the preliminary mixture.

Our work with the rubber pulp has developed that small proportions of rubber with fibers in stable association mixed with carton or box board pulp will greatly enhance the physical properties of carton or box board made therefrom. Such box board may be used of much less caliper than would otherwise be required, and thus we believe that our discovery has wider application so far as product is concerned, than the product of our process. Thus, precipitation of latex rubber in a beater, as has been attempted in the past, will probably develop some of the valuable properties in box and carton stock that we have observed, particularly where wet pressing is used.

The proportions of anti-precipitant do not seem to be critical. For example, good quality pulp was made with the use of only 20 pounds of ammonia solution of 29% $NH_3$ concentration, to 372 pounds of latex (38% solids) precipitated onto 130 pounds of sulphite pulp (bone dry weight).

We recommend, however, a higher amount of ammonia.

As some of the uses for the products produced as per our teachings above, we suggest:—

1. An uncured, vulcanizable sheet made on equipment for felting fibers from pulp and susceptible of molding under heat and pressure to form various items now made of vulcanized rubber or even ebonite (completely vulcanized rubber).

2. A paper mill product made completely of rubber and fiber, or with certain liners of rubber and fiber, and others of bitumen or resin (natural or artificial) or other heat plastic materials and fibers, with various kinds of fibers, suitable for embossing and decorating, as with paint or lacquer, for automobile tops, wall hangings, and the like.

3. A paper mill product suitable for being incorporated into rubber belting.

4. A new kind of roofing sheet.

5. A new kind of paper board for certain kinds of cartons, if desired greaseproof, and highly flexible, resilient under cold conditions, extremely stiff and strong, etc.

Having thus set forth our teaching by reference to our discoveries and certain practices following them, we claim the following as our invention:

1. That process which consists in mixing together rubber latex, ammonia solution, and fibrous material without evaporating the ammonia, until the mixture is complete, then further mixing in the presence of heat to evaporate the ammonia and set the rubber, and then forming a pulp by further mixing with water, for the purpose described, and, in a beater or suitable paper mill apparatus, diluting and mixing said pulp with other pulp forming materials, and passing the resulting material over a paper machine, said diluting and mixing taking place at room temperature or below, for the purpose described.

2. A process of producing pulps containing rubber substance, comprising first depositing the rubber substance on the fibers by mixing a mass of the fibers and rubber sustance while the mass is substantially less mobile than is required for final pulping, and while retarding precipitation of the rubber substance, then permitting effective precipitation of the rubber substance and finally continuing the mixing with the addition of water sufficient to disperse the fibers, with their preformed coating of rubber substance, to that degree required for forming the pulp into a sheet on a paper making machine, the rubber substance being derived from latex, the precipitation being retarded by ammonia in quantity equal to a major portion of the latex, and the effective precipitation being brought about by raising the temperature of the mix at a stage of mixing in which the association of fibers and rubber substance is substantially complete and free of agglomeration of the rubber substance, whereby the ammonia is evaporated due to the rise in temperature, the temperature of the mass being thereafter reduced for the dispersion step to a point at which no substantial agglomeration of the rubber substance will occur.

GEORGE ACUS.
HARRY C. FISHER.